(12) United States Patent
Josafatsson

(10) Patent No.: US 9,474,256 B2
(45) Date of Patent: Oct. 25, 2016

(54) TRAWL DOOR OR PARAVANE WITH REMOTE CONTROL ADJUSTMENT

(76) Inventor: Atli Mar Josafatsson, Reykjavik (IS)

( * ) Notice: Subject to any disclaimer, the term of this patent is extended or adjusted under 35 U.S.C. 154(b) by 0 days.

(21) Appl. No.: 14/232,331

(22) PCT Filed: Jul. 18, 2012

(86) PCT No.: PCT/IB2012/001396
§ 371 (c)(1),
(2), (4) Date: Mar. 7, 2014

(87) PCT Pub. No.: WO2013/014507
PCT Pub. Date: Jan. 31, 2013

(65) Prior Publication Data
US 2014/0202061 A1 Jul. 24, 2014

(30) Foreign Application Priority Data
Jul. 22, 2011 (IS) .............................. 8972

(51) Int. Cl.
*A01K 73/045* (2006.01)
*B63B 21/66* (2006.01)
*G01V 1/38* (2006.01)

(52) U.S. Cl.
CPC ............. *A01K 73/045* (2013.01); *B63B 21/66* (2013.01); *G01V 1/3826* (2013.01)

(58) Field of Classification Search
CPC ...... A01K 73/00; A01K 73/02; A01K 73/04; A01K 73/045
USPC ...... 43/9.1, 9.7; 114/243, 246, 144 R, 145 R
IPC .................... A01K 73/00, 73/02, 73/04, 73/045
See application file for complete search history.

(56) References Cited

U.S. PATENT DOCUMENTS

| 4,748,599 A * | 5/1988 | Gjestrum et al. ............... 367/17 |
| 4,890,568 A * | 1/1990 | Dolengowski ................ 114/246 |
| 5,267,408 A * | 12/1993 | Kinoshita ............. A01K 73/05 43/9.7 |
| 6,655,311 B1 * | 12/2003 | Martin et al. ................. 114/242 |
| 7,499,373 B2 * | 3/2009 | Toennessen .................... 367/16 |
| 7,946,237 B2 * | 5/2011 | Fong ...................... B63B 43/00 114/125 |
| 8,230,801 B2 * | 7/2012 | Hillesund et al. ............ 114/246 |
| 2003/0075094 A1 * | 4/2003 | Aoyama ................ B63H 25/44 114/145 R |

(Continued)

FOREIGN PATENT DOCUMENTS

| DK | WO 2015055207 A1 * | 4/2015 | .......... A01K 73/045 |
| EP | 1 696723 | 6/2005 | |
| EP | 1594359 | 6/2005 | |

(Continued)

*Primary Examiner* — Darren W Ark
*Assistant Examiner* — Magdalena Topolski
(74) *Attorney, Agent, or Firm* — Jennifer Meredith, Esq.; Meredith & Keyhani, PLLC

(57) ABSTRACT

A trawl door, deflector, vane or paravane (40) constructed with adjustable panels (22, 23, 24) and driving units (25) for control the water flow through the spreading device during towing through the water with remote control where driving units (25) are used to adjust the position of the panels control the water flow through the spreading device and maneuver the spreading device in optimum position in the towing direction, horizontally or vertically, the panels are adjustable independently to give enhanced performance of the operating systems, fishing trawl or seismic survey system, without having to pull the system to the towing vessel to adjust manually.

11 Claims, 19 Drawing Sheets

Section A-A

(56) References Cited

U.S. PATENT DOCUMENTS

2008/0022913 A1    1/2008  Toennessen
2008/0271356 A1 *  11/2008 Vigfusson ............ A01K 73/045
                                                      43/9.7

FOREIGN PATENT DOCUMENTS

| | | | | |
|---|---|---|---|---|
| GB | 1405076 | 9/1975 | | |
| GB | 2122562 | 1/1984 | | |
| GB | 2161441 A * | 1/1986 | ............ | B63B 1/283 |
| GB | 2424950 | 11/2006 | | |
| GB | 2440636 | 6/2008 | | |
| JP | 05201388 A * | 8/1993 | | |
| JP | 2004298126 A * | 10/2004 | | |
| NO | 08200006 A * | 2/1982 | | |
| SU | 1746970 | 7/1992 | | |
| WO | WO 8202646 A1 * | 8/1982 | ........... | A01K 73/045 |
| WO | WO 86/02525 | 5/1986 | | |
| WO | WO 98/24685 | 6/1998 | | |
| WO | WO 2005/055708 | 6/2005 | | |
| WO | WO2005/055708 | 6/2005 | | |
| WO | WO2005055709 | 6/2005 | | |
| WO | WO 2010/019049 | 2/2010 | | |
| WO | WO 2013/014507 | 1/2013 | | |

* cited by examiner

Section A-A

Section A-A

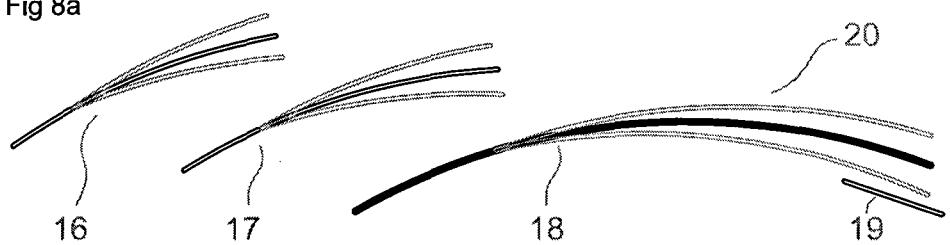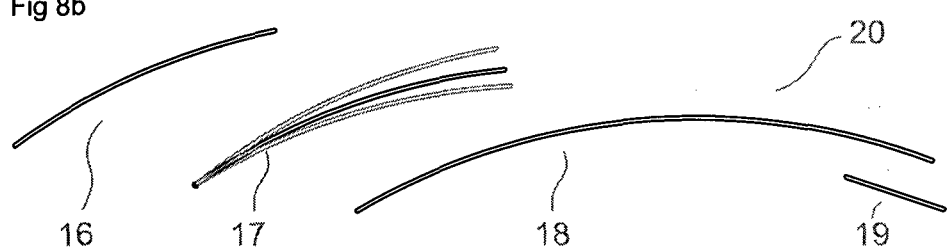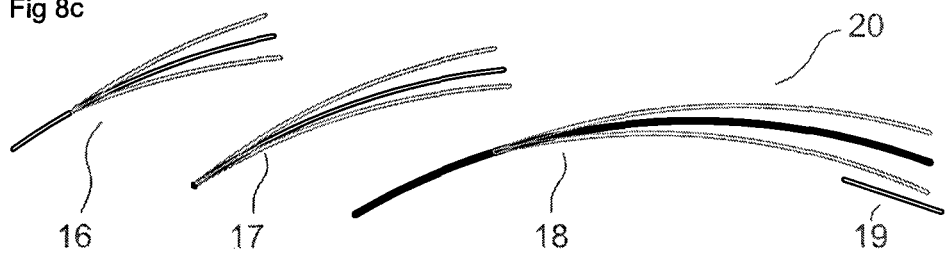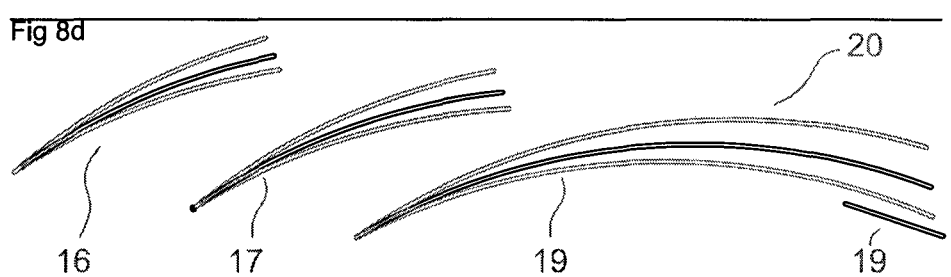
Fig 8

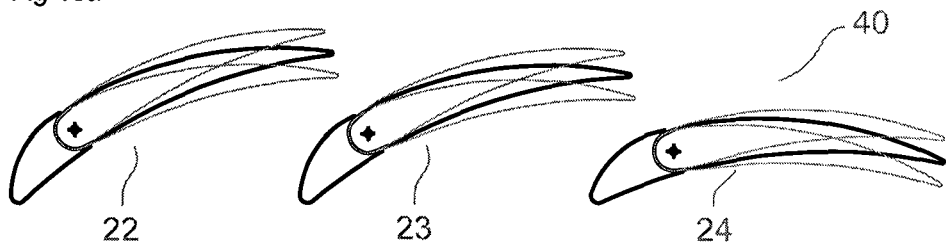
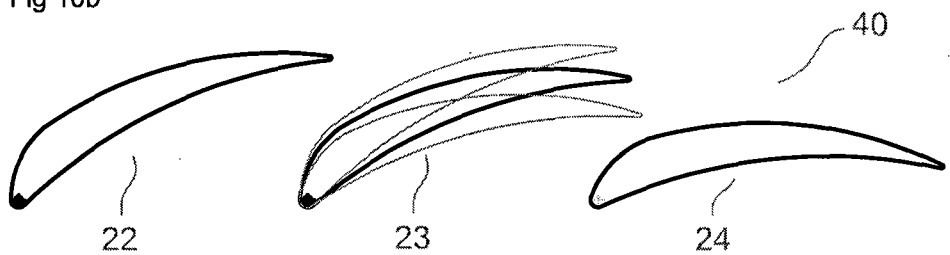
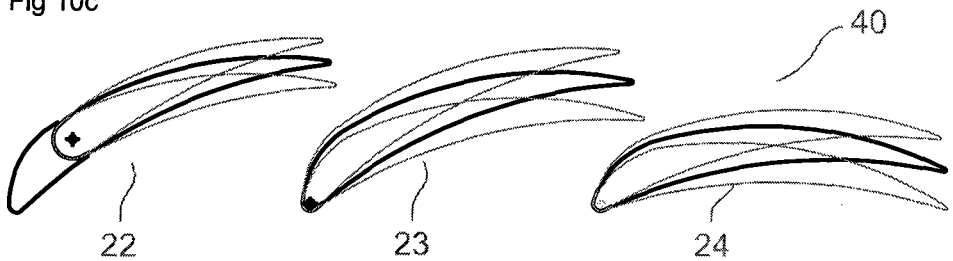
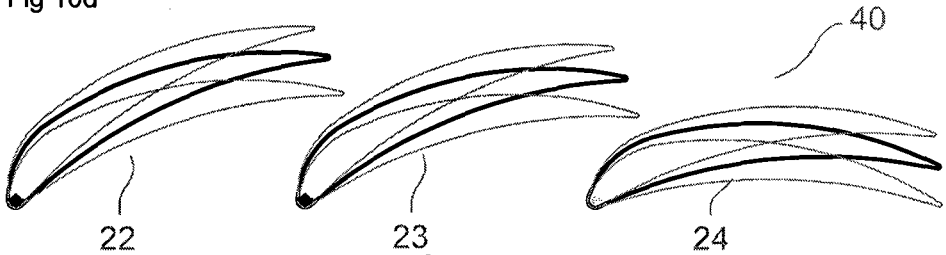
Fig 10

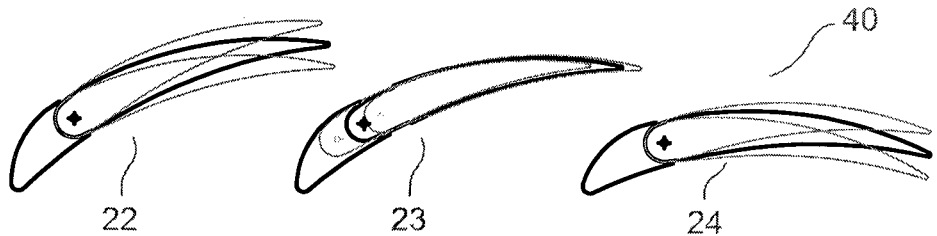
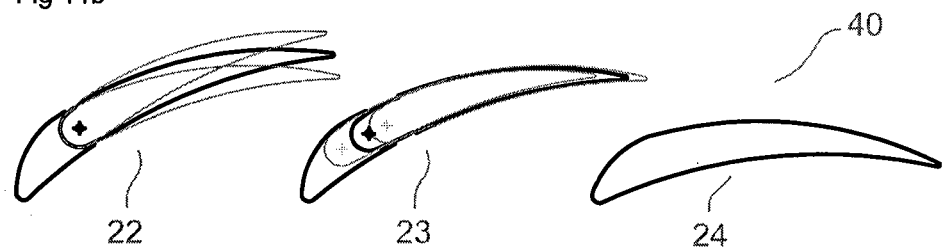
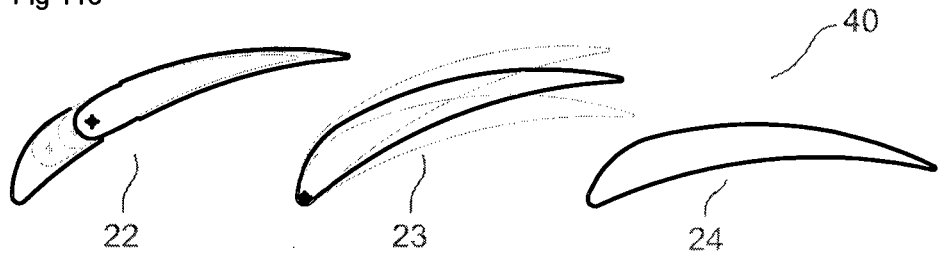
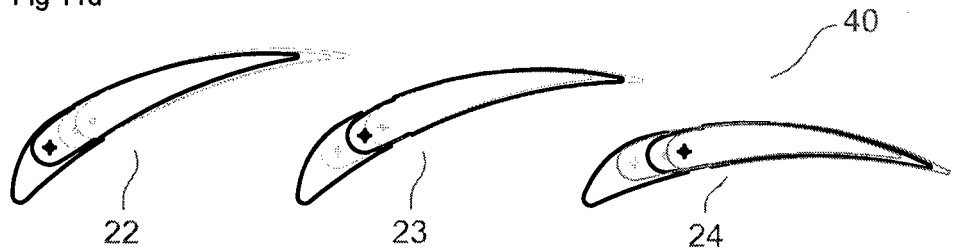
Fig 11

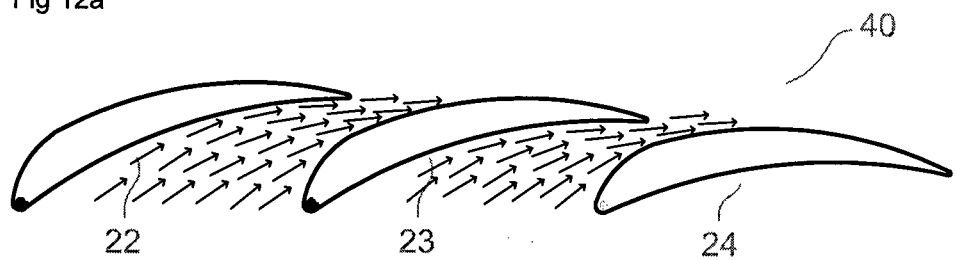
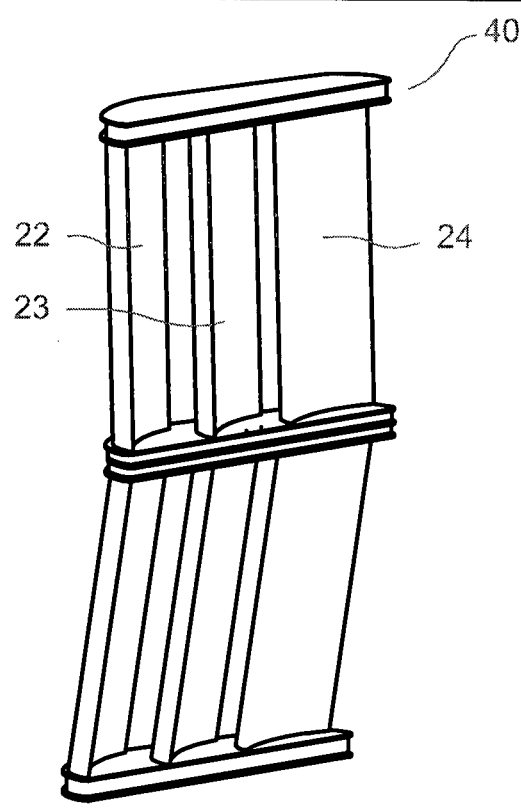
Fig 12

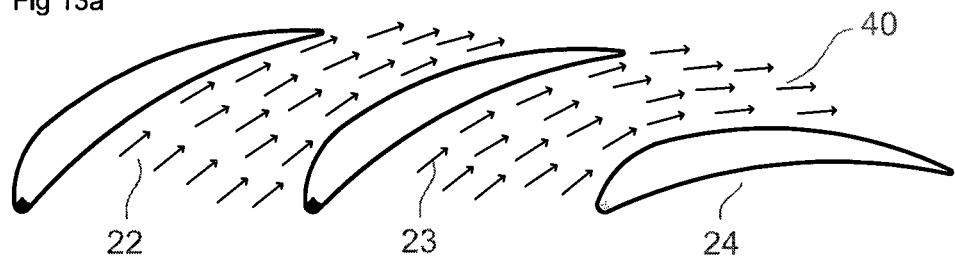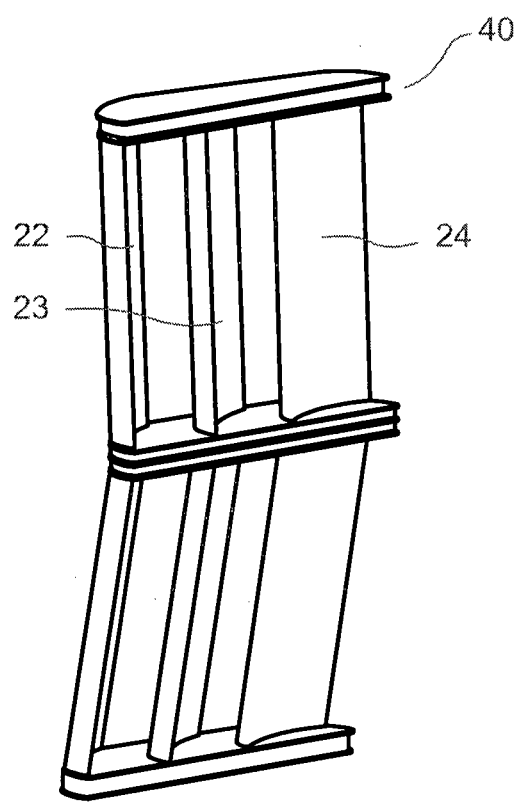
Fig 13

TRAWL DOOR OR PARAVANE WITH
REMOTE CONTROL ADJUSTMENT

FIELD OF THE INVENTION

The present invention relates to a trawl door, deflector, vane or paravane for remote controlled maneuvering during towing through the water.

BACKGROUND OF THE INVENTION

The invention relates to spreading devices used in trawl fishing and seismic survey operations, generally referred to as trawl doors, otterboards, deflectors, vanes or paravanes herein after also referred to as a "spreading device".

Trawl doors in general, are used for demersal, semi-pelagic and pelagic fishing and paravanes are used for seismic surveys; they have the same basic purpose and can be of the same construction. The main purpose of trawl doors is to control opening of the fishing trawl to optimize catching performance of the complete fishing gear. The main purpose of paravanes is to spread the seismic system with a number of streamers behind a vessel.

Trawl doors are used to open a system of fishing gear. They are set from the vessel to the sea with its components connected between them. The doors spread out to each side from the vessel and generate a distance so the components, namely the fishing trawl, wires and cables herein after referred to as a "system", are in optimal fishing conditions. A trawl door is connected to a steel wire cable or a synthetic rope leading from the vessel and the fishing net is connected to the trawl door in the opposite direction with another set of steel wire cables or synthetic ropes. Trawl doors are used in pairs were the trawl door on the right side is called "starboard door" and the trawl door on the left side is called "port side door".

Paravanes or vanes are used to spread a system of streamers for a seismic survey. They are also used in pairs and are set from the vessel in a similar way as trawl doors to pull the streamers to each side of the vessel. Paravanes are almost without an exception, connected to synthetic ropes leading from the vessel and the seismic system, between the streamers and other components are also connected with synthetic ropes.

Basically, trawl doors and paravanes have the same purpose, to spread and hold the components in position between them.

DESCRIPTION OF THE PRIOR ART

Overall in the industry, the method to change position of a trawl door or paravane, its angle of attack or pitch or roll, is both a complex and time consuming process as it is necessary to pull the spreading device to the surface to the vessel or onboard the vessel. Connecting units, shackles, connector or hooks leading to and from the spreading devices are disconnected and re-connect in different positions and the system is set out again to the sea.

Several spreading devices and methods are known with solutions to adjust opening of the spreading device, manually onboard a vessel or remote controlled during towing, generally based on complex technical solutions with limited range of use.

GB 1405076, WO 86/025025 and SU 1746970 teach a trawl door with manually movable dampers to cover completely or partially a vertical opening of the trawl door while WO 2010/019049 relates to a trawl door equipped with remote controlled movable dampers to cover a horizontal opening of the trawl door during towing. GB 2122562 provides a spreading device with remote controlled adjustment of the angle of attack during towing.

Trawl door according to GB 1405076 and SU 1746970 are equipped with dampers which are manually controlled where it is necessary to go through quite complicated and time consuming process and haul the trawl doors onboard the towing vessel to make any minor modification of the dampers. After any modification has been made, the trawl doors are set out again to the sea.

Trawl door according to GB 2122562 are equipped with remote control system of the towing brackets to adjust the angle of attack of the trawl door. When adjusting angle of attack of a trawl door, its spreading force will change. Reduced angle of attack gives less spreading force while increased angle of attack give greater spreading force. This simple system to control the trawl doors during towing on purpose to gain greater distance between the trawl doors will substantially increase the resistance of the trawl doors and increase fuel consumption.

When referring to "angle of attack" of a spreading device, it means the towing angle of the spreading device in relation to the direction of the towing vessel as 0° degree. This is clearly explained in FIG. 3.

The trawl doors in use during the period from 1960 to 1980, referring to GB 1405076 and SU 1746970, were simple designed and constructed from only one main body formed with small curve or no curve at all with very poor spreading force compared to trawl doors at present day. Because of design and low efficiency, the trawl doors had to be tuned in very high angle of attack to spread the fishing gear, even as high as 40° degrees or more to operate sufficiently.

A trawl door, equipped with movable dampers to cover actual surface of the trawl door, vertically or horizontally and towed at a great angle of attack can surely be controlled if one damper is differently open against the other. However, its un-efficiency in respect to poor spreading force performance will hardly make that design of a trawl door a feasible option today.

In the first half of the 1990', a giant leap was taken in design of trawl doors and development when hydrodynamic and aerofoil designed trawl doors were introduced with greater efficiency, increased spreading force and reduced resistance than seen before in trawl doors. The new designs made it possible to operate a trawl door in far less angle of attack with better results than previous models of trawl doors. Improved design of bottom trawl door can be operated in as little as 32° to 34° degrees to operate sufficiently while an improved design of pelagic trawl door can be operate in as little as 20° to 22° degrees angle of attack with good results.

WO 2010/019049 teaches a more modern design of a trawl door with dampers to control a vertical opening of a small section of the trawl door. If this model of a trawl door is operated at a greater angle of attack than 30° degrees, different openings of dampers will increase or reduce water flow through the door and the position can be controlled.

However, if the same model of a trawl door is operated in as little angle of attack as just over 20° degrees, different openings of dampers will generate much less flow of water through the trawl door. Because of little angle of attack, the trawl door will have reduced resistance but will have very little effect to change the trawl doors position.

The greater angle of attack a trawl door is operated in, the more water flow can be controlled to pass through the trawl door and change its position but great angle of attack means higher resistance and more drag. The less angle of attack the trawl door is operated in, the less water flow can be controlled to pass through the trawl door and change its position but less angle of attack means less resistance and less drag.

U.S. Pat. No. 7,658,161 comprise a deflector device for seismic surveys with adjustable bridles capable to vary tilt and roll angle and control position of the deflectors. One embodiment includes one deflector body with adjustable wing flaps as known from airplanes to re-distribute the lift of the wing along the span to create a moment of force that results in tilt angle.

Adjusting bridles to control position of a deflector by changing its tilt and roll angle is limited to control the depth of the deflector. When a seismic survey system is deployed through the water, it has already been set to its preferable and most economical position with given distance between deflectors and as described in U.S. Pat. No. 7,568,161, "The present invention relates to a system for controlling the depth of a seismic deflector under tow through the water".

The same bridle system can also control angle of attack of the spreading device to increase or reduce distance between the deflectors. By decreasing angle of attack to reduce distance between the deflectors, this will create a slack on the bridles connecting the seismic components of streamers and other electronic equipment towed between the pair of deflectors and jeopardize to damage the equipment. By increasing angle of attack to increase distance between the deflectors, will have no meaning at all but substantially increase drag of the deflectors.

A deflector according to U.S. Pat. No. 7,658,161 is limited to a spreading device with one body comprising an upper controllable movable flap and a lower controllable movable flap.

Flaps represent a small section of the trailing edge of a fixed air wing, most commonly less than one fourth of the width of the wing. When flaps are moved or extended, the stalling speed of the aircraft reduces, which means that the aircraft can fly safely at lower speeds, especially during takeoff and landing.

Any movement of the flaps, representing such a small part of the wing as described in U.S. Pat. No. 7,658,161, to change position of the deflector will act directly against the streamlined design of the aerofoil wing and increase drag force.

GB 2 440 636 describes a paravane deflector for a seismic survey with a controllable diverter (panel). The diverter is configured to redirect the flow of water past the paravane with respect to a direction of motion of the paravane through water. The deflector includes a steering device. The steering device is configured to controllably redirect the flow of water so as to control an amount of lateral force generated by the paravane.

As explained in GB 2 440 636, the steering device, such as a rudder, may be rotated by a control unit to rotate the diverters (panels).

The limitation with this invention it that by rotating the diverters (panels) all at the same time and all in the same direction, the flow of water controls the lateral force of the paravane and its horizontal position in the sea.

Two publications, EP 1,696,723 relates to adjustment of trawl doors via remote controlled acoustic signals and EP 1,594,359 relates to monitoring trawl operation comprising measuring sensor which can be positioned on trawl doors to control its angular position in the water during towing. Both publications are focused on the sensors, not the trawl doors and neither publication have any references to adjustment of the trawl doors inner construction.

None of the above mentioned solutions provides independent adjustment of parts or sections of parts of the inner construction of a spreading device to control the water flow through during towing.

OBJECTS OF THE INVENTION

The object of the present invention is to provide an improved spreading device, in particular a spreading device with a system to independently adjust parts or sections of parts of the inner construction of the spreading device to control the water flow through the device and maneuver its position during towing, horizontally or vertically.

Another object of the present invention is to improve performance of the fishing gear and seismic survey with controllable system on the spreading device for the benefit of more economical operation, greater catching ability for fishing and more economical for both operations in terms of reduced fuel consumption.

BRIEF SUMMARY OF THE INVENTION

According to the invention there is provided a spreading device for trawl fishing and seismic survey operations, the device comprising:—
  an upper frame defining a top upper edge of the device;
  a lower frame defining a bottom lower edge of the device;
  at least two panels connected between the upper and lower frames;
  driving units mounted on the frames, and adapted to alter the position of the panels, the driving units adapted to be controlled remotely, when the device is in use being towed through the water
  characterized in that at least one of the at least two panels are adjustable independently In some embodiments the spreading device may comprise a single portion, however, in some the spreading device may comprise two or more portions joined together by intermediately frames, between the upper and lower frames. In such examples the panels in the separate portions will typically be independently moveable.

Typically the portions will be parallel to each other. Alternatively, the portions may be angled with respect to each other. In other embodiments the portions can be made in cross curved design. While the portions will typically be of equal lengths, this will not always be the case, and the portions can be of different lengths.

Preferably at least one of the at least two panels are curved or partly curved.

Typically at least one of the at least two panels will be of aerofoil construction.

Preferably at least one of the at least two panels may include a further fixed panel.

Conveniently, each panel may comprise more than one section, for example a front section and a back section. Importantly the sections of the panels are adjustable independently.

Preferably the drive units are adapted to move the panels along the frame relative to each other. Alternatively or additionally the drive units can be used to alter the angle of the panels relative to the frame. The driving units may be hydraulic driving units, magnetic driving units or electric driving units. In addition, the driving units may be battery driving units where at least one of the batteries is rechargeable battery.

Typically the driving units will be controlled by wireless communication with the towing vessel. This may in the form of acoustic signals or radio frequency signals. However, alternatively the driving units may be controlled via an electrical cable attached to the towing vessel.

Preferably the device can be provided with at least one sensor to measure at least one parameter of the device, including measuring the depth of the spreading device, pitch and roll and distance from one spreading device to the other

DRAWINGS

To help understand the invention, specific embodiments thereof will now be described by way of example and with reference to the accompanying drawings, in which;

FIG. 8 is a cross-sectional view of spreading device 20 constructed from first spoiler, second spoiler, main body and after spoiler explaining different combinations of movable parts or sections of parts.

FIG. 10 is a cross-sectional view of spreading device 40 constructed from first aerofoil body, second aerofoil body and third aerofoil body explaining different combinations of movable parts or sections of parts.

FIG. 11 is a cross-sectional view of spreading device 40 constructed from first aerofoil body, second aerofoil body and third aerofoil body explaining different combinations of movable parts or sections of parts.

FIG. 12 is a cross-sectional view and perspective view of spreading device 40 constructed from first aerofoil body, second aerofoil body and third aerofoil body adjusted in normal position to explain great concentration of water flow.

FIG. 13 is a cross-sectional view and perspective view of spreading device 40 constructed from first aerofoil body, second aerofoil body and third aerofoil body adjusted in more open position to explain less concentration of water flow.

DESCRIPTION OF THE INVENTION

Those skilled in the art will understand meaning of the words most commonly used in the industry, such as;

"Pitch" is used when spreading device is guided up or down. "Pitch down" when front part of the spreading device is guided down and "pitch up" when front part of the spreading device is guided up.

"Roll" is used when spreading device is controlled sideways, "roll in" when upper part is guided in and "roll out" when upper part is guided out.

Figure 3:
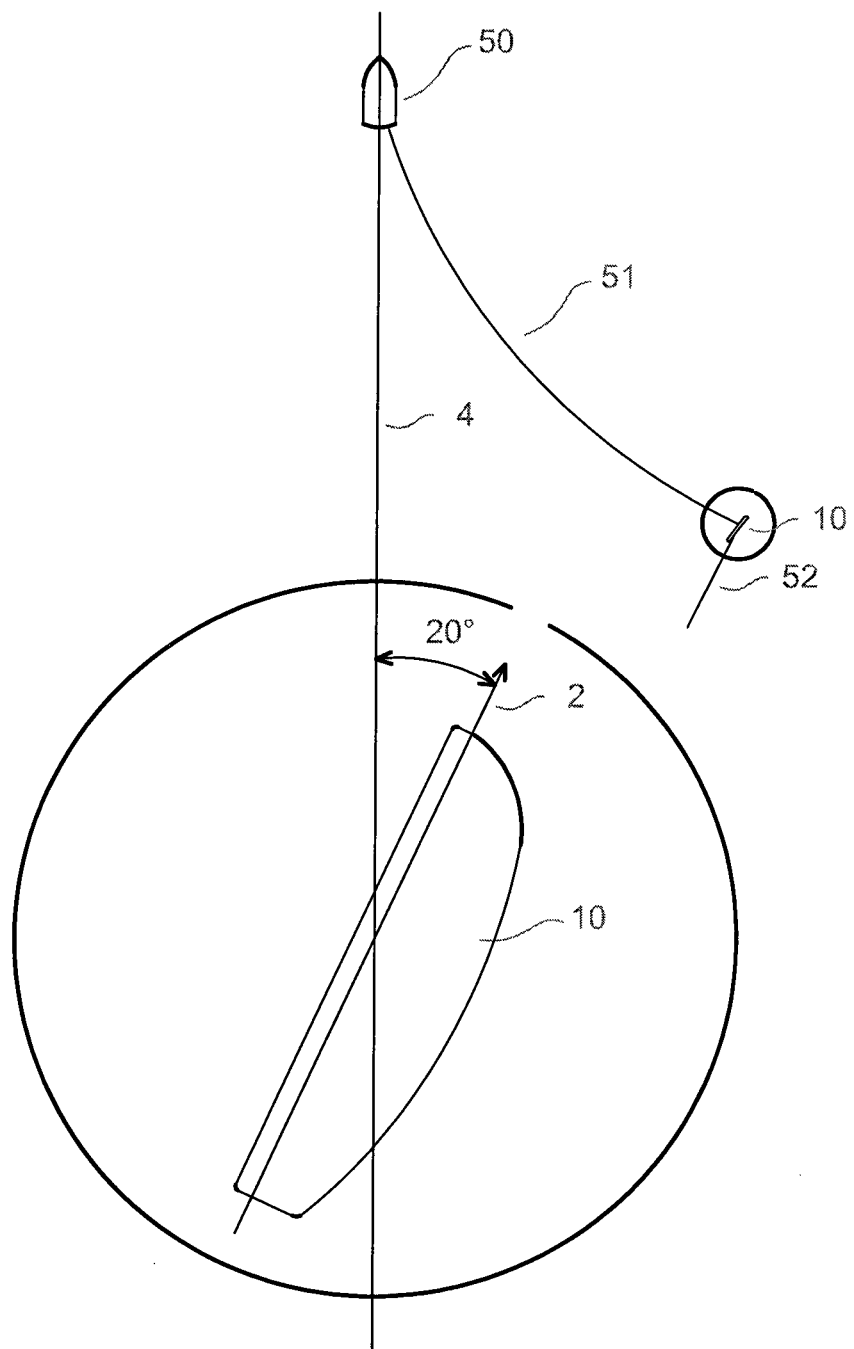
FIG. 3 is an aerial view of a fishing vessel towing a system of fishing gear explaining angle of attack of the spreading device versus the towing direction.

"Angle of attack" is the angle of the spreading device as it is towed through the water in the direction of the towing vessel and measured through the horizontal line 2 as explained in FIG. 3

"Front" or "forward" of the spreading device is the leading edge (14) on FIGS. 4, 5, 6 and 7 and "rear" of the spreading device is the trailing edge (15) on FIGS. 4, 5, 6, and 7.

"Away" is used when parts or sections of parts of the spreading device are moved back or away from other parts of the device to increase opening of the device for more flow of water.

"Closer" is used when parts or sections of parts of the spreading device are moved in or closer to other parts of the device to reduce opening of the device for less water flow.

The present invention provides a spreading device for trawl fishing or seismic survey operations with a system to adjust panels or sections of panels of the inner construction of the spreading device during operation to control the water flow through the spreading device and there by adjusting its position in the sea, horizontally or vertically.

Figure 14:
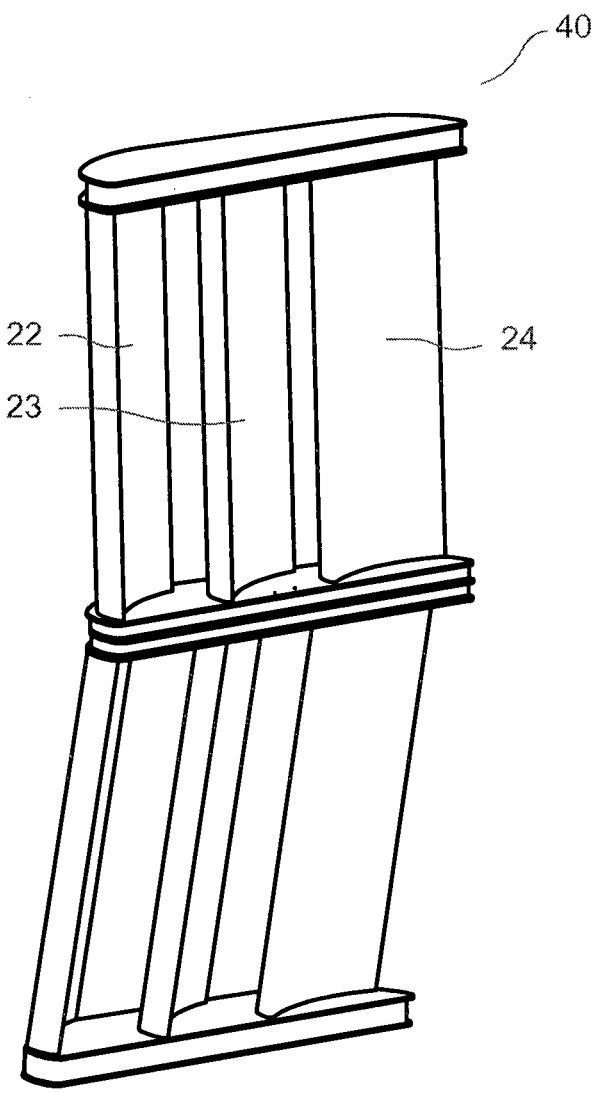
FIG. 14 is a perspective view of spreading device 40 constructed from first aerofoil body, second aerofoil body and third aerofoil body explaining upper portion adjusted in normal position but lower portion adjusted in more open position.
Figure 15:
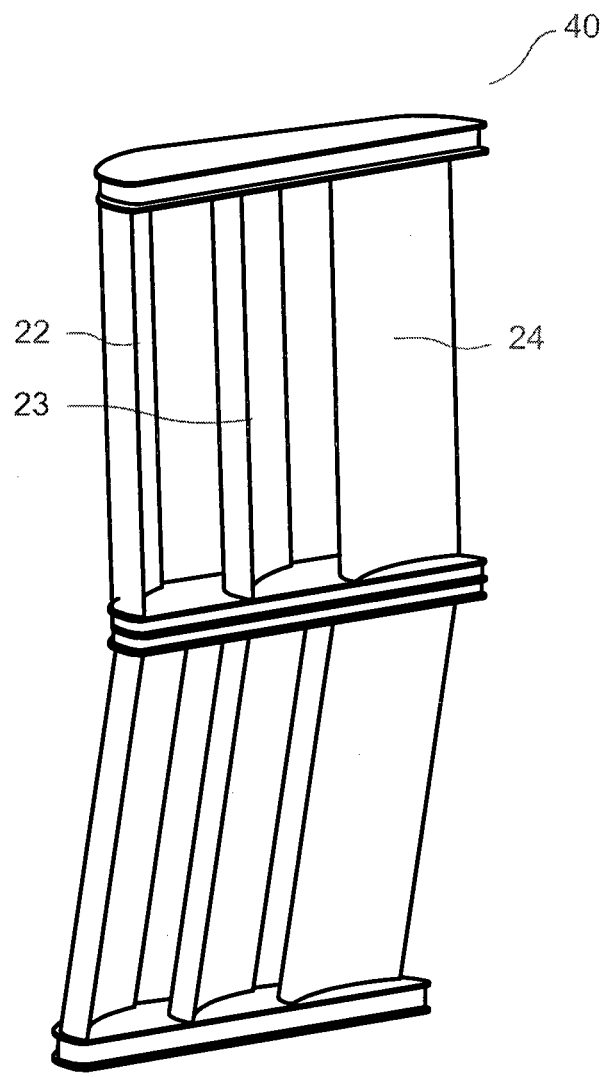
FIG. 15 is a perspective view of spreading device 40 constructed from first aerofoil body, second aerofoil body and third aerofoil body explaining upper portion adjusted in more open position but lower portion adjusted in normal position.

To maneuver the spreading device in optimum position in the towing direction, horizontally or vertically, the panels are adjustable independently to give enhanced performance of the operating systems. FIG. 14 and FIG. 15 shows spreading devices with differently adjusted panels, which will perform differently in the sea.

A spreading device adjusted according to FIG. 14 with more open lower section for more water flow will guide the system down while a spreading device adjusted according to FIG. 15 with more open upper section for more water flow will guide the system closer to the surface.

Figure 1:
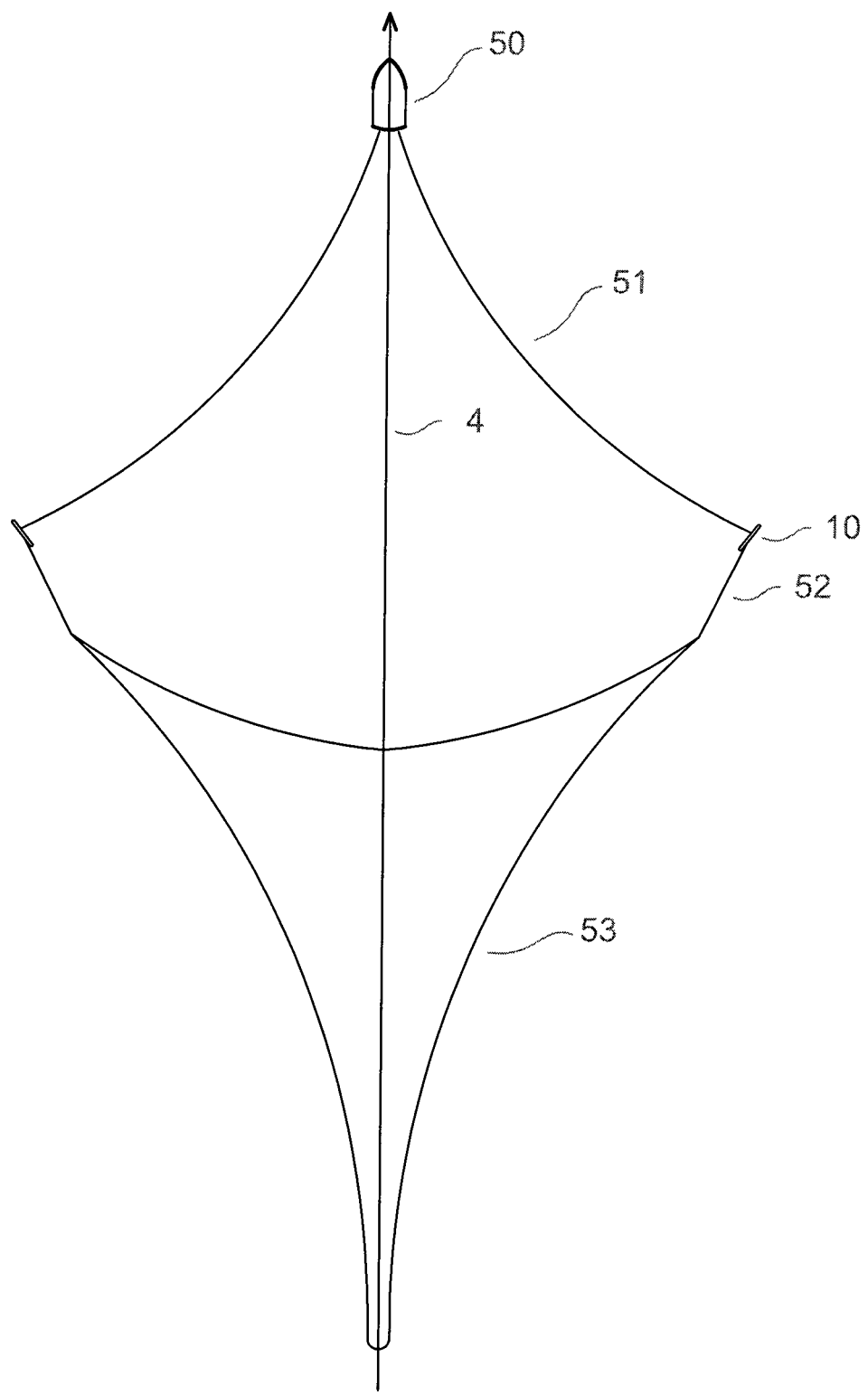
FIG. 1 is an aerial view of a fishing vessel towing a system of fishing gear.

Referring initially to FIG. 1, this is an aerial view of fishing vessel 50 towing a system of fishing gear comprising a pair of spreading devices 10 connected to the towing cables 51 and bridles 52 connected to the rear end of the spreading device to the fishing trawl 53. The drawing shows the towing direction 4 of the fishing vessel and position of the fishing gear.

Figure 2:
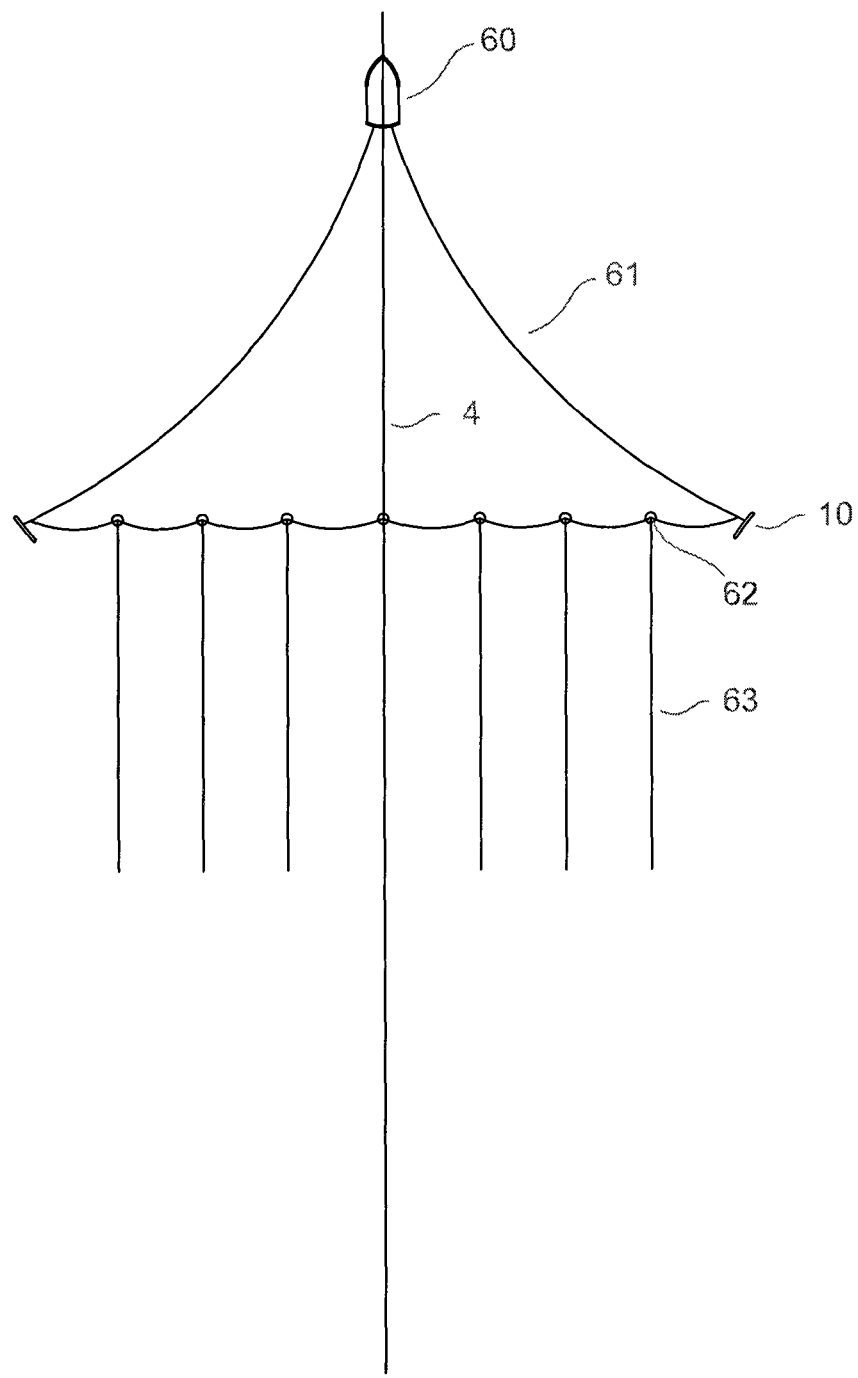
FIG. 2 is an aerial view of a seismic vessel towing a seismic survey system.

FIG. 2 is an aerial view of seismic vessel 60 towing a seismic survey system comprising a pair of spreading devices 10 connected to the towing cable 61 and spreading rope 62 connected between the spreading devices and series of streamers 63. The drawing shows towing direction 4 of the seismic vessel and position of the seismic survey system.

FIG. 3 is an aerial view of fishing vessel 50 towing a system of fishing gear with detailed view of spreading device 10 explaining its angle of attack as it is towed through the water in direction 4 of the towing vessel. Angle of attack of the spreading device according to this drawing is measured as 20° degrees through horizontal line 2.

Performance in terms of spreading force of one model of body versus another model of body can depend on the volume of water flow passing through the device. If two models of spreading devices are constructed in same design of inner body formed with same length of plates in same curves but with different opening for the water flow passing through the spreading device, a substantial difference in spreading force and drag will occur between these two models depending on its inner construction.

Spreading device according to present invention and by means of remote controlled adjustments makes it possible to maneuver its position during towing. The system can adjust part of the spreading device inner body to control the water flow through the spreading device and maneuver its position in the sea, horizontally or vertically.

Figure 4:
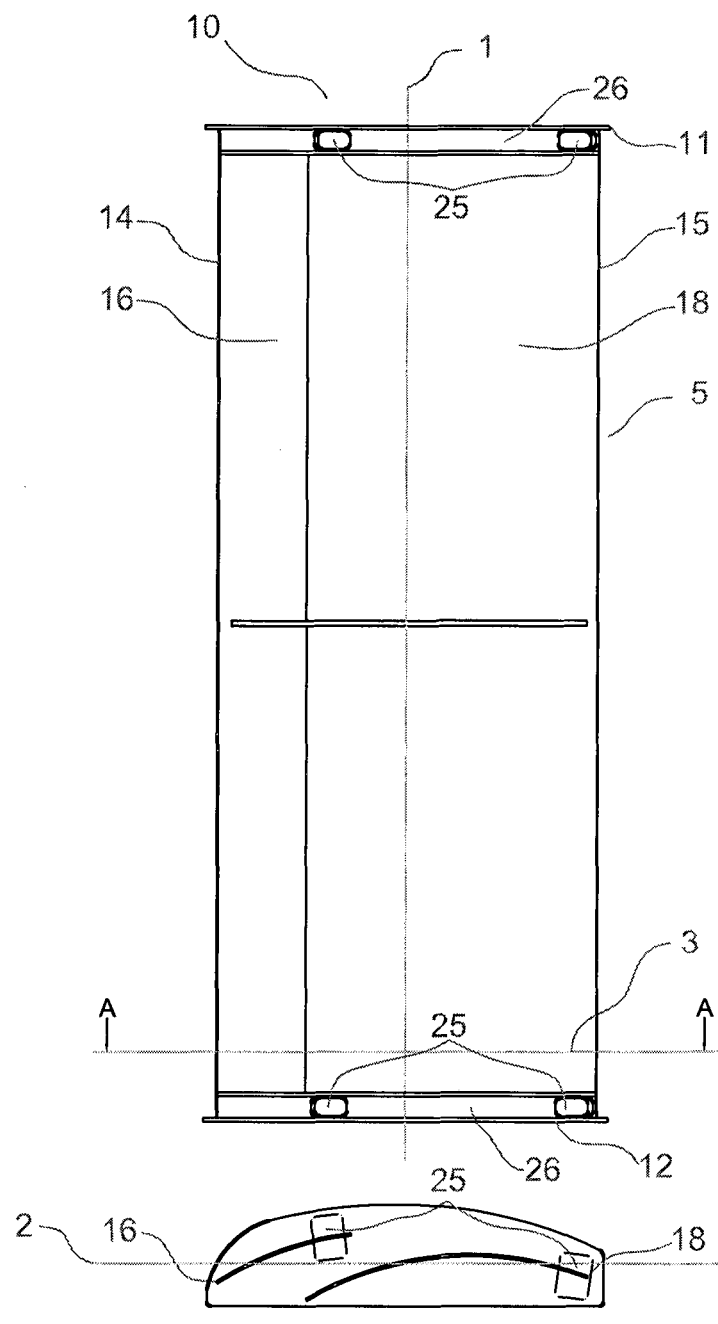
FIG. 4 is a front view and cross view through A-A of spreading device 10 having one portion and constructed from first spoiler and main body.

Referring now to FIG. 4, spreading device 10 is provided as a single portion 5, having an upper frame and a lower frame, between which are connected at least two panels; a first spoiler 16 and a main body 18. The position of the panels relative to the frames can be adjusted using driving units 25 mounted on the frames.

The front parts of adjustable panels, the part closer to the leading edge 14, have a fixed rotating point connected to the frames while the aft part of adjustable panels is movable by means of driving units alongside the frames. The driving units are connected to the aft part of the panels so they are movable to adjust the position of the panels closer to each other or further apart to control the water flow through the spreading device, reduce or increase the water flow, the panels being adjustable independently.

In some embodiments part of the panels are movable. On such embodiments, the front part of the panel closer to the leading edge is fixed while the aft part has a rotating point connected to the frames and is movable alongside the frames.

The spreading device can be constructed in direct version, in v-shaped version along the central axis 1 and/or in cross curved design. The panels of the spreading devices, fixed or movable, can include plates being curved, partly curved or aerofoil designed bodies.

As discussed the driving units 25 maneuver the opening of each panel of the body by means of remote control communication between spreading device and vessel. Various devices can be used, such as electronic equipment with receiver and transmitter for the controlling signals, wireless communication via hydro acoustic signals, radio frequency signals or lead in cables from vessel to the spreading device.

Driving units 25 are mounted on aft part of each panel of the spreading device where each panel can have one or more driving units to maneuver the opening of each panel or section of a panel. In the preferred embodiment a pair of driving units mounted on the aft edge of each panel, one at the upper part and another at the lower part of the panel. The driving units can also be located in special compartments 26 as shown in FIGS. 4 and 6 to protect the driving units and its mechanical system.

The driving units for each section of the spreading device inner body may comprise hydraulic driven devices. Alternatively the driving units for each section of the spreading device inner body may comprise magnetic driven devices. In another alternative the driving units for each section of the spreading device inner body may comprise electrical driven devices.

Inner construction of the spreading devices can implement various embodiments, all from one panel of the device body to have a movable aft part of a panel to one or all of the panels of the body to be fully movable.

Figure 5:
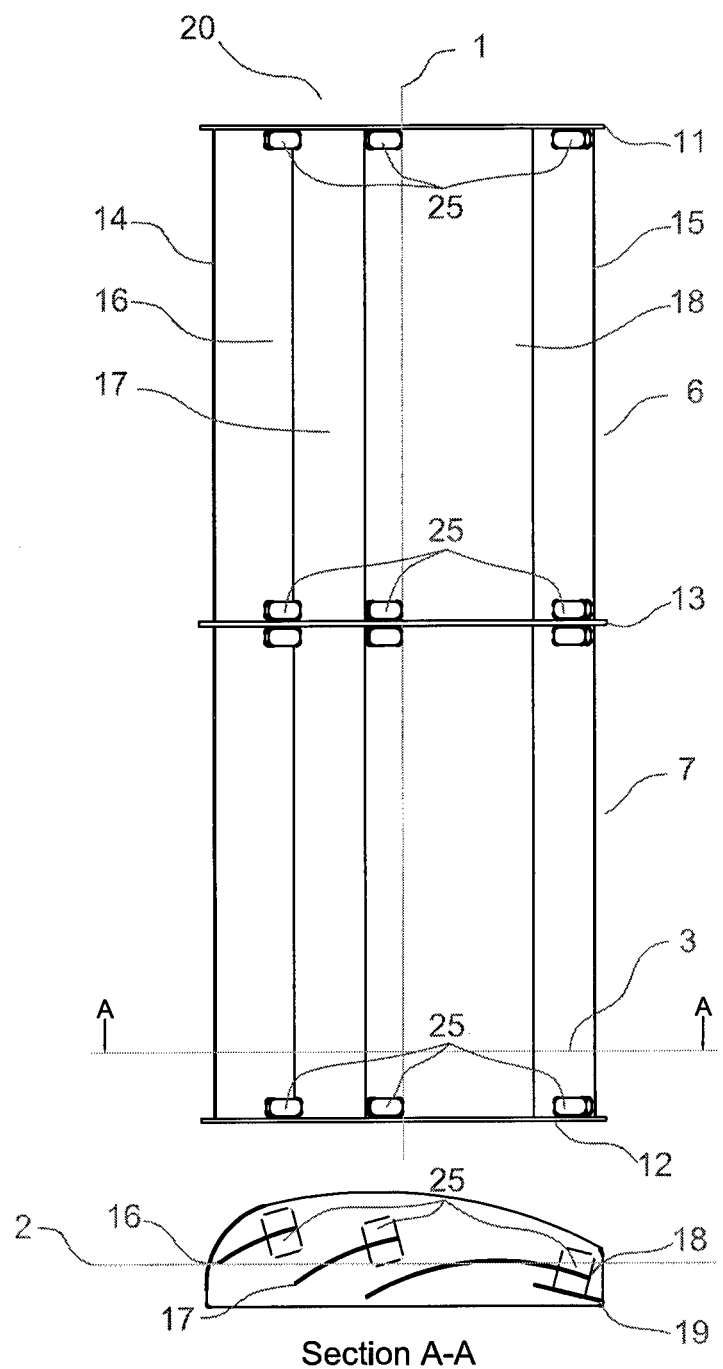
FIG. 5 is a front view and cross view through A-A of spreading device 20 having two portions and constructed from first spoiler, second spoiler, main body and aft spoiler.
Figure 6:
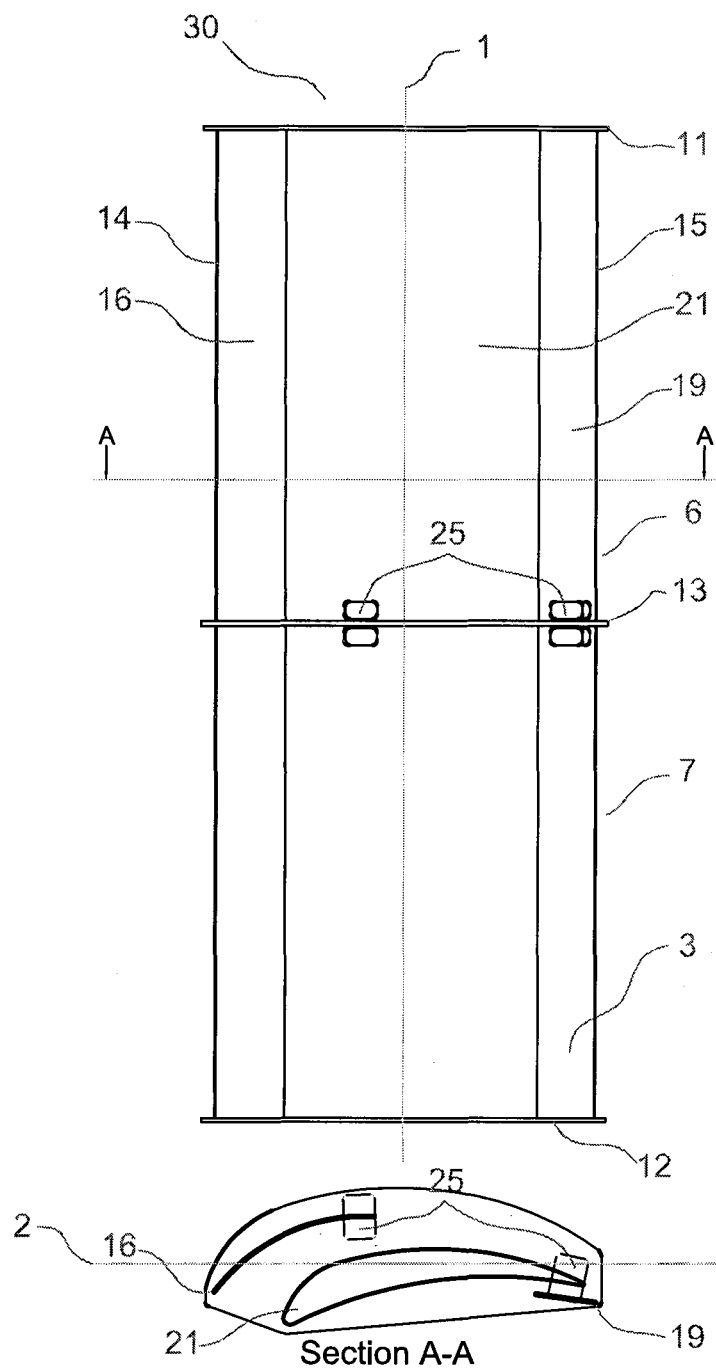
FIG. 6 is a front view and cross view through A-A of spreading device 30 having two portions and constructed from first spoiler, main body of aerofoil design and aft spoiler.
Figure 7:
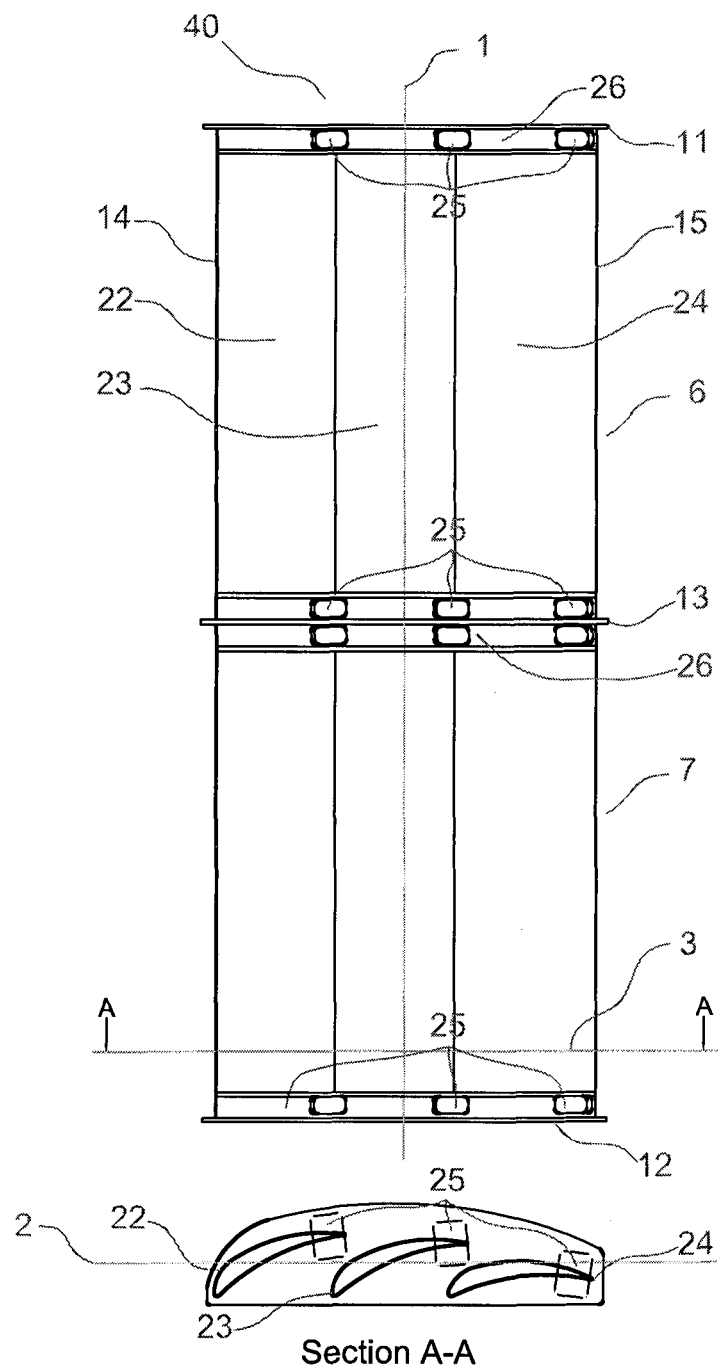
FIG. 7 is a front view and cross view through A-A of spreading device 40 having two portions and constructed from first aerofoil body, second aerofoil body and third aerofoil body.

The spreading device can comprise one portion 5 as shown in FIG. 4, two portions as shown in FIGS. 5, 6 and 7 with an upper portion 6 and a lower portion 7, or more than two portions including centre portions, upper portions and lower portions. The portions, upper, lower or centre, do not need to be of the same length. The spreading device comprises a top edge 11, a bottom edge 12, centre line 13, leading edge 14 and trailing edge 15 as shown in FIGS. 4, 5, 6 and 7.

Each portion of the spreading device can include plates or spoilers formed in curves, an arc of a circle or aerofoil shaped parts. A simple version is spreading device 10 as shown in FIG. 4 having one portion and constructed from front spoiler 16 and main body 18. Both main body and front spoiler and main body are movable relative to top and bottom frames. Spreading device 10 is equipped with four driving units 25, located in special compartments 26, to maneuver adjustment of the doors inner construction. The driving units are mounted in pairs on-the aft end of each movable panel of the spreading device, located in special compartments on top and bottom frames.

FIG. 5 shows a spreading device 20 having two portions and constructed from four panels, a front spoiler 16, a second spoiler 17, a main body 18 and an aft spoiler 19. All sections, main body, front spoiler and second spoiler are movable relative to top and bottom edges and centre plate. Spreading device 20 is equipped with twelve driving units to maneuver adjustment of the doors inner construction, which are mounted in pairs on the aft end of each movable panel, on top frame and centre frame on the upper portion and on centre frame and bottom frame on the lower portion. The panels being adjustable independently.

Another version of a spreading device is shown in FIG. 6, a spreading device 30 having two portions and constructed from three panels, a front spoiler 16, a main body of aerofoil design 21 and an aft spoiler 19. All sections are movable independently relative to top and bottom frames and centre frame. Spreading device 30 is equipped with four driving units to maneuver adjustment of its inner construction. The driving units are mounted in pairs on the aft end of each movable section towards the centre frame as shown in this figure but can also be mounted on top frame on the upper portion and the bottom frame on the lower portion.

Yet another version of a spreading device is shown in FIG. 7, a spreading device 40 having two portions and constructed from three panels, first aerofoil body 22, second aerofoil body 23 and third aerofoil body 24. All sections, the three aerofoil designed bodies are movable relative to top and bottom edges and centre plate. Spreading device 40 is equipped with twelve driving units, located in special compartments, to maneuver adjustment of its inner construction. The driving units are mounted in pairs on the aft end of each movable section, on top frame and centre frame on the upper portion and on centre frame and bottom frame on the lower portion FIG. 8 shows a traditionally constructed trawl door 20 with its inner construction made from series of plates forming its body of first spoiler 16, second spoiler 17, main body 18 and aft spoiler 19. One embodiment of spreading device 20, shown in FIG. 8a has movable sections of all parts of the body. In another embodiment shown in FIG. 8b, second spoiler 17 is movable and embodiment shown in FIG. 8c, first spoiler 16 has movable section, second spoiler 17 is movable and main body 18 has movable section. Yet another embodiment is shown in FIG. 8d, where all panels are movable.

Figure 9:
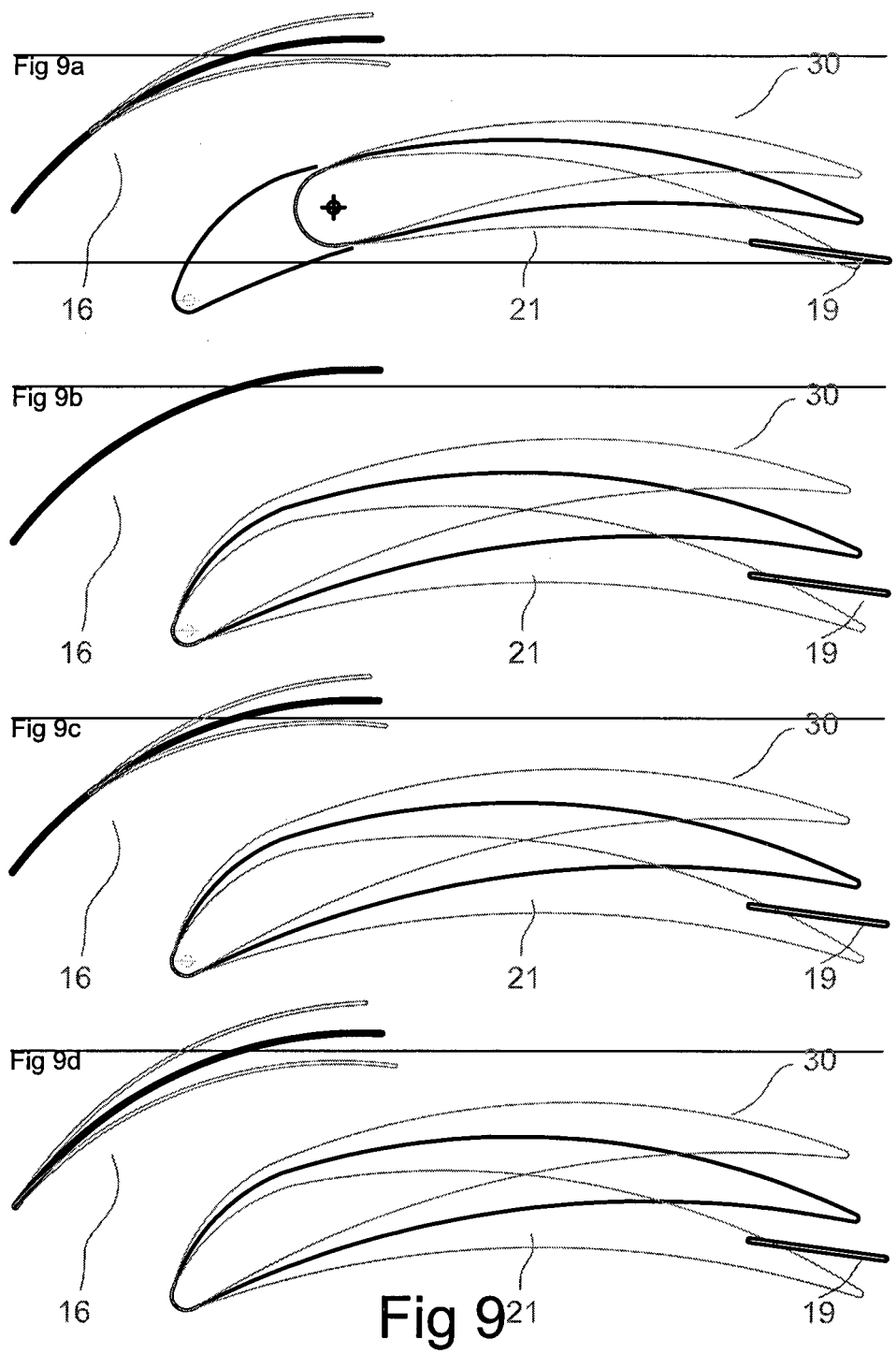
FIG. 9 is a cross-sectional view of spreading device 30 constructed from first spoiler, main body of aerofoil design and aft spoiler explaining different combinations of movable parts or sections of parts.

FIG. 9 also shows a traditionally constructed trawl door 30 with its inner construction made from first spoiler 16, main body of aerofoil design 21 and aft spoiler 19. One embodiment of spreading device 30, shown in FIG. 9a has first spoiler 16 with movable section and aerofoil body 21 has movable section. In another embodiment shown in FIG. 9b, the aerofoil body 21 is movable and embodiment shown in FIG. 9c, first spoiler 16 has movable section and aerofoil body 21 is movable. Yet another embodiment is shown in FIG. 9d, where first spoiler 16 is movable and aerofoil body 21 is movable.

FIG. 10 shows a new design of spreading device 40 with its inner construction made from series of three bodies in aerofoil design, first aerofoil body 22, second aerofoil body 23 and third aerofoil body 24. Embodiment shown in FIG. 10a of spreading device 40, has all aerofoil bodies with movable section. In another embodiment shown in FIG. 10b, second aerofoil body 23 is movable and embodiment shown in FIG. 10c, first aerofoil body 22 has movable section, or and aerofoil bodies 23 and 24 are movable. Yet another embodiment is shown in FIG. 10d, where all aerofoil bodies are movable.

FIG. 11 shows spreading device 40 with its inner construction made from series of three bodies in aerofoil design, first aerofoil body 22, second aerofoil body 23 and third aerofoil body 24. One embodiment of spreading device 40, shown in FIG. 11a has first aerofoil body 22 with movable section, second aerofoil body 23 has extendable section and third aerofoil body 24 has movable section. In another embodiment shown in FIG. 11b, first aerofoil body 22 has movable section and second aerofoil body 23 has extendable section and embodiment shown in FIG. 11c, first aerofoil body 22 has extendable section and second aerofoil body 23 is movable. Yet another embodiment is shown in FIG. 11d, where all aerofoil bodies are extendable.

FIG. 12 is a cross sectional view and perspective view of spreading device 40 constructed from first aerofoil body 22, second aerofoil body 23 and third aerofoil body 24. First and second aerofoil bodies are movable. FIG. 12a explains cross sectional view of the spreading device with first and second aerofoil bodies adjusted in preferable position to utilize the water flow passing through the device for most effective spreading force. The arrows indicating the water flow explains great concentration of the water passing through the device and it gains high spreading force. FIG. 12*b* shows the opening of the spreading device through perspective view.

FIG. 13 is a cross sectional view and perspective view of the same spreading device 40 constructed from the same three aerofoil bodies. FIG. 13*a* explains cross sectional view of the spreading device with first aerofoil body 22 adjusted away from second aerofoil body 23 and second aerofoil body 23 adjusted away from third aerofoil body 24 to increase the water flow passing through the device. The arrows clearly indicate far less concentration of the water passing through the device and it loses its spreading force. FIG. 13*b* shows far greater opening of the spreading device through perspective view.

Spreading device 40, adjusted according to FIG. 12 has greater spreading force as the water flow is utilized better through the spreading device while spreading device adjusted according to FIG. 13 has less spreading force because too much water flow passes through and it loses its spreading force.

By adjusting inner sections of the spreading device body to control the water flow through the device, its position in the water can be maneuvered to an optimum position for the benefit of more economic operation. Below, we will describe a few examples and advantage to be gained in terms of improved operation for the fishing industry and seismic survey system.

For the fishing industry, the system will create opportunities for fishing vessels to participate in fishing conditions were they are not able to operate today. Fishing for species like Mackerel and Sardine, mainly caught very close to the surface at a trawling speed of 5.0 nautical miles or more, powerful fishing vessels can keep the fishing gear close to the surface and achieve satisfactory results. Fishing for species in deeper waters, powerful fishing vessels can operate with heavy fishing gear to go deep enough with satisfactory results.

With the present invention of independently adjustable panels, fishing vessels with less power can maneuver the spreading device to “roll in”, it will lean inside so the water flow will give lift to the spreading device and guide it closer to the surface. Fishing vessels catching in deep water, can maneuver the device to “roll out”, it will lean outside so the water flow will press the spreading device down, guiding the fishing gear deeper using less ratio of towing cable versus depth than known before.

FIG. 14 is a perspective view of spreading device 40 constructed from first aerofoil body 22, second aerofoil body 23 and third aerofoil body 24. The upper portion of the spreading device has been adjusted with aerofoil bodies close to each other to utilize the water flow passing through the device for effective spreading force while the lower portion of the spreading device has been adjusted with aerofoil bodies away from each other to allow more water flow to pass through the device for less effective spreading force. A spreading device adjusted in this position will have more force on the upper portion, will “roll out” and the system will go deeper in the sea.

FIG. 15 is a perspective view of spreading device 40 constructed from first aerofoil body 22, second aerofoil body 23 and third aerofoil body 24. The upper portion of the spreading device has been adjusted with aerofoil bodies away from each other to allow more water flow to pass through the device for less effective spreading force while the lower portion of the spreading device has been adjusted with aerofoil bodies close to each other to utilize the water flow passing through the device for effective spreading force. Spreading device adjusted in this position will have more force on lower portion, will "roll in" and the system will go closer to the surface.

Figure 16A:
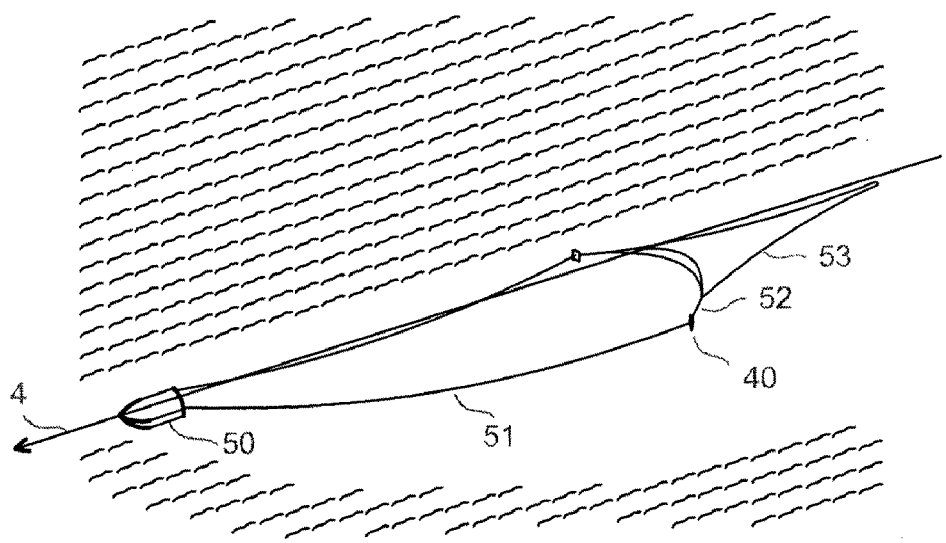
FIG. 16a is an aerial view of towed fishing system explaining position of the fishing gear guided close to the surface.
Figure 16B:
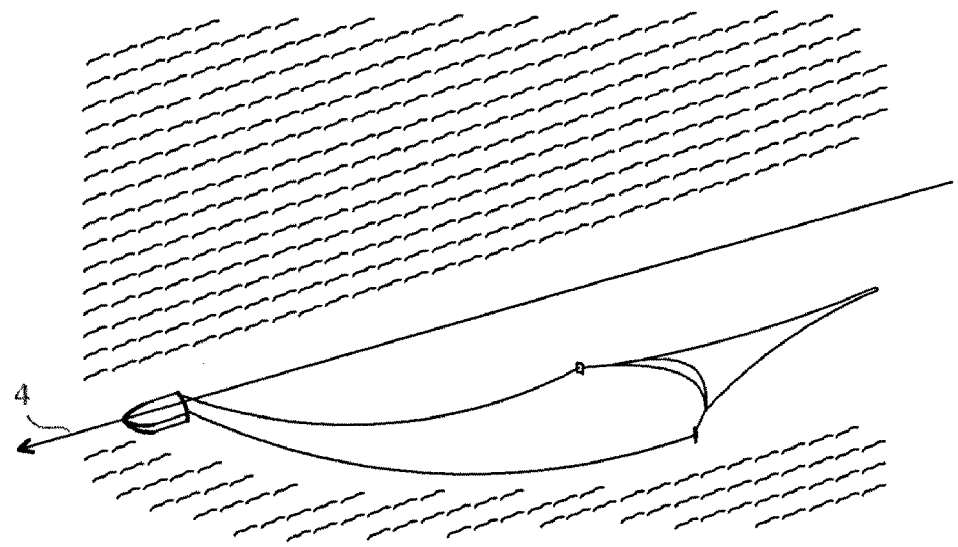
FIG. 16b is an aerial view of towed fishing system explaining position of the fishing gear guided deeper in the sea.

FIG. 16a shows a fishing vessel 50 towing a fishing gear where spreading devices 40 have been adjusted to "roll in" and guided close to the surface while FIG. 16b shows the same fishing gear and spreading devices being adjusted to "roll out" and forced deeper.

With modern electronic fish finding equipment, fish concentration in the sea around a fishing vessel is clearly seen and fishing skippers can evaluate the volume of fish entering the mouth of the fishing trawl.

It is a known fact that fishing vessels can tow for hours trying to catch fish with little results and during all that time, the fishing gear is towed in full operation with required force to pull it through the sea and related high fuel consumption.

With the present invention, the spreading devices can be maneuvered to reduce spread so distance between the devices will be at a minimum so resistance from both devices and the fishing trawl is reduced with more economical results in terms of less fuel consumption.

By moving a panel or part of a panel of the spreading device further away from other panels of the spreading device as shown in FIG. 13, it will open the spreading device so more water will flow through the spreading device and spreading force will be reduced. If spreading force is reduced, the spreading device will lose power to spread and come closer to each other, i.e. distance between the pair of spreading devices will be reduced.

By moving a panel or part of a panel of the spreading device closer to other panels of the spreading device, as shown in FIG. 12, will reduce the openings in the device so less water will flow through the device and the spreading force will be increased. The spreading device will gain power to spread the fishing gear or seismic survey system and the devices will move further away from each other, i.e. distance between the pair of spreading devices will be increased.

Operating a fishing gear provided with present invention of remote controlled adjustment of the inner construction of the spreading device, this operation can be conducted during towing and it will substantially reduce fuel consumption while spreading device 40 is operated according to FIG. 13. If greater concentration is seen on fish finding equipment, the body of spreading device 40 can be adjusted according to FIG. 12, the devices will gain spreading force and the complete fishing gear will come to optimal fishing conditions.

Figure 17A:
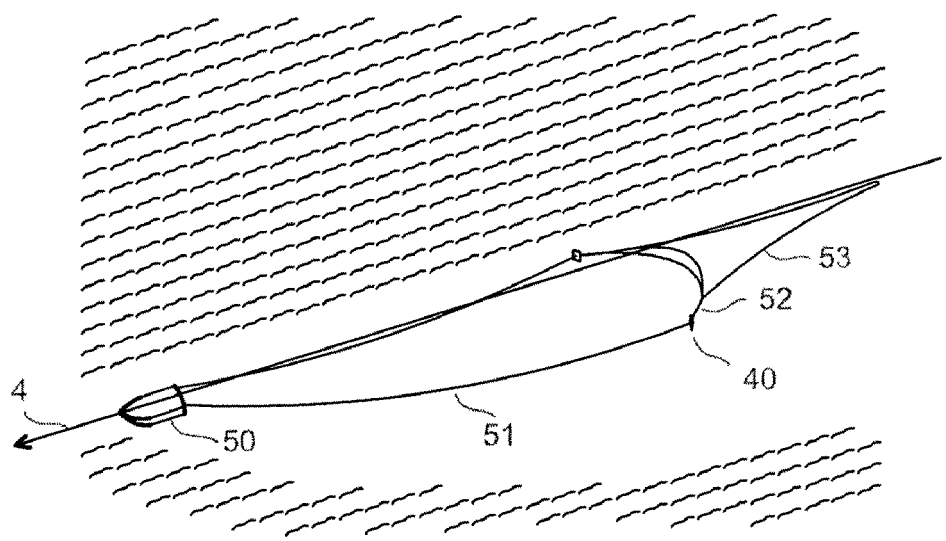
FIG. 17a is an aerial view of towed fishing system explaining position of the fishing gear with spreading devices adjusted in normal position and normal distance between spreading devices.
Figure 17B:
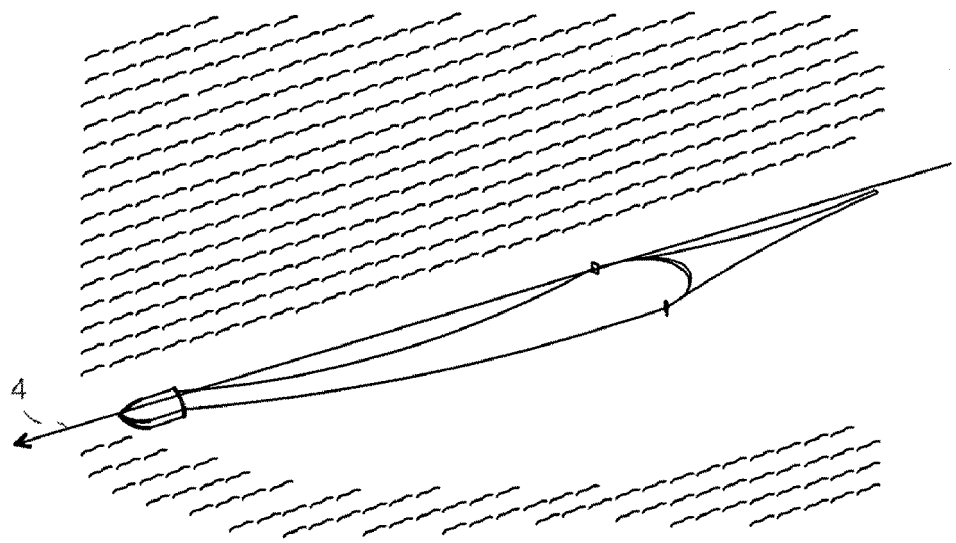
FIG. 17b is an aerial view of towed fishing system explaining position of the fishing gear with spreading devices adjusted in open position and very little distance between spreading devices.

FIG. 17a shows a fishing vessel 50 towing a fishing gear where spreading devices 40 has been adjusted with aerofoil bodies close to each other for more effective spreading force and hold good distance between the spreading devices while FIG. 17b shows the same fishing gear and spreading devices being adjusted with aerofoil bodies away from each other for less effective spreading force and reduce the distance between the spreading devices for more economical purpose.

The system can also move the aft section of aerofoil body forward so it goes inside the aerofoil body to shorten its length or backwards to extend the length of the aerofoil body.

By moving, for instant aft section of an aerofoil body further inside the body, it will open the device so more water will flow through the device and spreading force will be reduced. By moving the aft section of the aerofoil body further aft, the aerofoil body will be extended so less water will flow through the device and spreading force will be increased.

As an example, if extendable section of the first aerofoil body 22 of spreading device 40 according to FIG. 11c is moved inside the body, the aerofoil body will be shortened, more water will flow through the spreading device and it will lose spreading force and distance between the pair of spreading devices will be reduced.

As another example, if the extendable section of the first aerofoil body 22 of spreading device 40 according to FIG. 11c is moved further aft, the aerofoil body will be extended, less water will flow through the spreading device and it will gain spreading force and distance between the pair of spreading devices will be increased.

Another option to maneuver the spreading devices and its system is to guide them to either side from the towing vessels, to starboard side or to the port side. As an example, the starboard spreading device can be maneuvered with less opening according to FIG. 12 to increase spreading force while the port side spreading device will be maneuvered with more opening according to FIG. 13 to reduce spreading force and the complete system, fishing gear or seismic survey system, will move to the starboard side of the towing vessel.

Figure 18A:
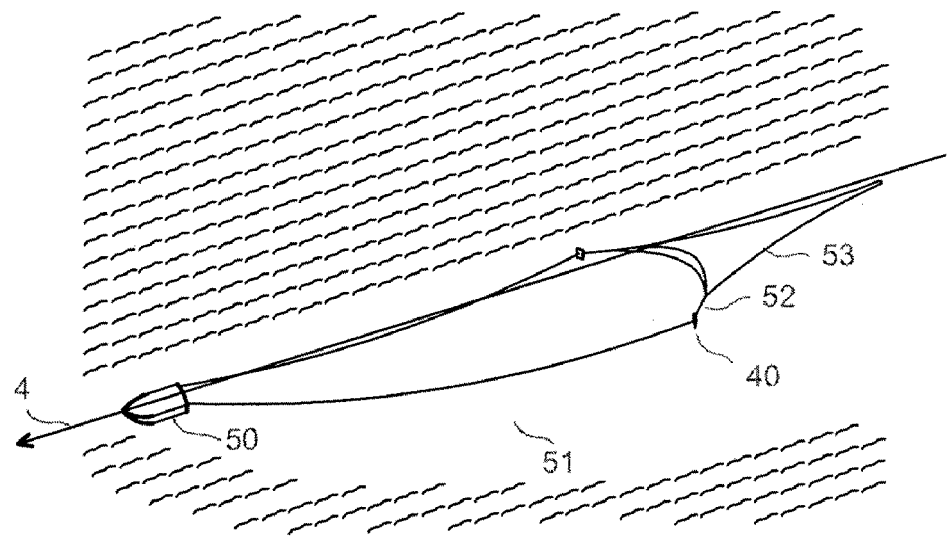
FIG. 18a is an aerial view of towed fishing system explaining position of the fishing gear with spreading devices adjusted in normal position and normal distance between spreading devices.
Figure 18B:
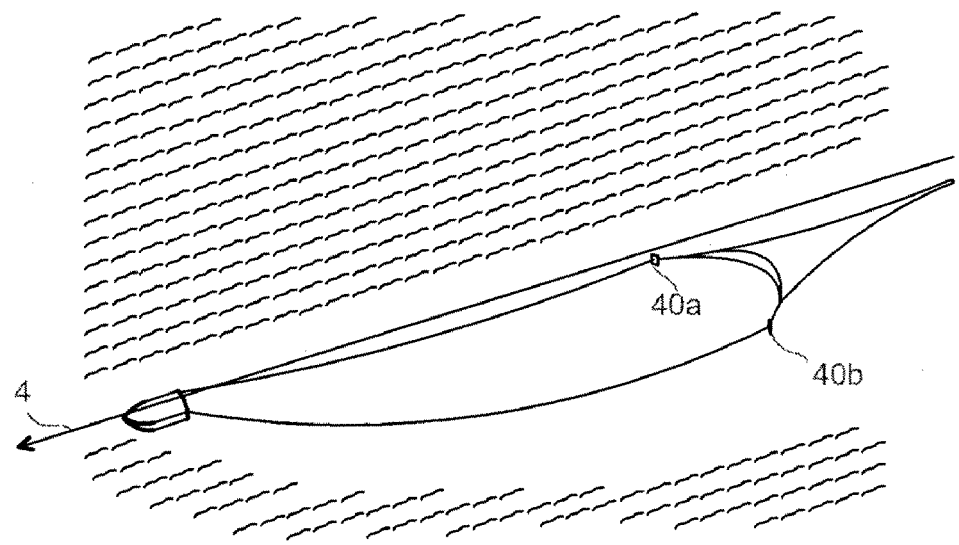
FIG. 18b is an aerial view of towed fishing system explaining position of the fishing gear with one spreading devices adjusted in normal position and one spreading device adjusted in open position guiding the fishing gear to the port side of the towing direction.

FIG. 18a shows a fishing vessel 50 towing a fishing gear where spreading devices 40 has been adjusted with aerofoil bodies in same position and the fishing gear towed behind the vessel in towing direction 4. FIG. 18b shows the same fishing gear where starboard side spreading device 40a has been adjusted with aerofoil bodies away from each other according to FIG. 12 for less effective spreading force and it has moved inside while the port side spreading device 40b has been adjusted with aerofoil bodies closer to each other according to FIG. 13 for more effective spreading force.

The starboard side spreading device 40a looses spreading force and moves to the port side of the towing direction while the port side spreading device 40b gains spreading force and moves also to the port side of the towing direction. The complete fishing gear is now positioned far to the port side of the towing direction of the fishing vessel as has been explained in FIG. 18b.

For the seismic industry, the system will give greater opportunities to maneuver the horizontal position of the seismic survey system. Present seismic survey system with a pair of spreading devices and many streamers is towed at same depth during the towing period which can last up to two months, despite variable depth of water.

Figure 19A:
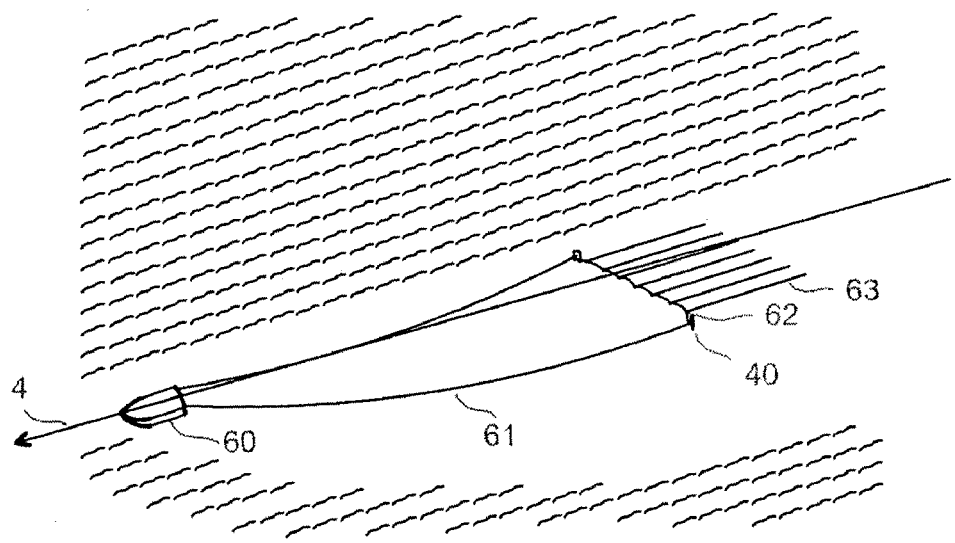
FIG. 19a is an aerial view of towed seismic system explaining position of the seismic survey guided close to the surface.
Figure 19B:
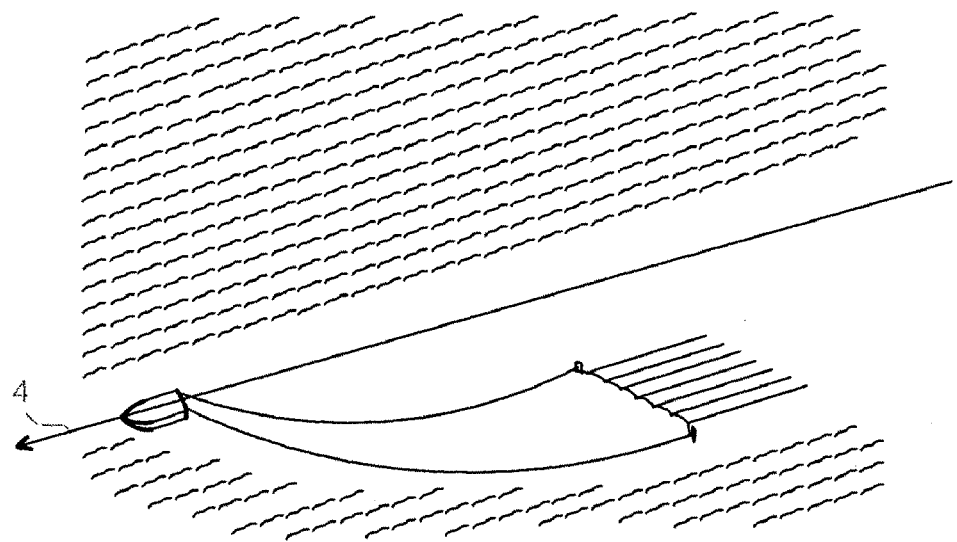
FIG. 19b is an aerial view of towed seismic system explaining position of the seismic survey guided deeper in the sea.

To obtain as accurate data as possible during seismic surveys of geological subsurface simulation, constant distance of the system to the seabed is most important. With present invention, horizontal position of the spreading devices can be maneuvered so the seismic system can be positioned in preferable distance to the seabed. FIG. 19a explains a seismic vessel 60 towing a seismic survey system where spreading devices 40 have been adjusted to "roll in" and guided close to the surface while FIG. 19b explains the same seismic survey system and spreading devices being adjusted to "roll out" and forced deeper.

The present invention will make it possible by means than known today in the industry of spreading devices to control position of fishing gear or seismic system during operation.

The invention claimed is:

1. A spreading device for trawl fishing and seismic survey operations, the device comprising:
    an upper frame defining a top edge of the device;
    a lower frame defining a bottom edge of the device;
    a middle frame between the upper and lower frame;
    at least two upper panels connected between the upper frame and the middle frame, wherein each of the at least two upper panels have a leading edge and a trailing edge;
    at least two lower panels connected between the middle frame and the lower frame, wherein each of the at least two lower panels have a leading edge and a trailing edge;
    driving units mounted on (1) the upper frame and the lower frame; or (2) the middle frame; or (3) the upper frame, the lower frame and the middle frame, and adapted to alter the position of at least one of the upper panels or the lower panels, the driving units adapted to be controlled remotely, when the device is in use being towed through the water,
    wherein at least one of the at least two lower panels or at least one of the at least two upper panels is adjustable independently with respect to the other panel of the at least two lower panels or the other panel of the at least two upper panels respectively to adjust the position of the panels closer to each other or further apart to control water flow through the device between the at least two upper panels from the leading edge to the trailing edge and between the at least two lower panels from the leading edge to the trailing edge.

2. A spreading device as claimed in claim 1, the at least two upper panels or the at least two lower panels:
    have leading and trailing edges,
    are angled with respect to the upper and lower frames and at least a part of a front one of them is adjustable to move its trailing edge closer to or further apart from an adjacent one of them;
    the leading edge of the adjacent panel is at least substantially non-adjustable.

3. A spreading device as claimed in claim 2, wherein the trailing edge of the one panel overlaps the leading edge of the other panel with respect to which it is adjustable.

4. A spreading device as claimed in claim 1, wherein at least one of the at least two upper panels or at least two lower panels are curved or partly curved or of aerofoil construction.

5. A spreading device as claimed in claim 1, wherein at least one of the at least two upper panels or at least two lower panels includes a further fixed section.

6. A spreading device as claimed in claim 1, wherein each panel may comprise more than one section and the sections are adjustable independently.

7. A spreading device as claimed in claim 1, wherein the driving units are adapted to move the panels along the frame relative to each other.

8. A spreading device as claimed in claim 1, wherein the adjustable panel has a fixed rotation point.

9. A spreading device as claimed in claim 1, wherein the driving units are hydraulic driving units or magnetic driving units or electric driving units or battery driving units where at least one of the batteries is a rechargeable battery.

10. A spreading device as claimed in claim 1, wherein the driving units are controlled by wireless communication with the towing vessel via acoustic signals or radio frequency signals with the towing vessel or via an electrical cable attached to the towing vessel.

11. A spreading device as claimed in claim 1, wherein the device is provided with at least one sensor to measure at least one parameter of the device.

* * * * *